US010073657B2

(12) United States Patent
Tanaka

(10) Patent No.: US 10,073,657 B2
(45) Date of Patent: Sep. 11, 2018

(54) DATA PROCESSING APPARATUS, DATA PROCESSING METHOD, AND COMPUTER PROGRAM PRODUCT, AND ENTRY PROCESSING APPARATUS

(71) Applicant: Toshiba Memory Corporation, Minato-ku (JP)

(72) Inventor: Shingo Tanaka, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 364 days.

(21) Appl. No.: 14/796,671

(22) Filed: Jul. 10, 2015

(65) Prior Publication Data
US 2016/0054929 A1    Feb. 25, 2016

(30) Foreign Application Priority Data

Aug. 20, 2014  (JP) .................................. 2014-167882

(51) Int. Cl.
*G06F 12/00*    (2006.01)
*G06F 3/06*    (2006.01)

(52) U.S. Cl.
CPC .............. *G06F 3/067* (2013.01); *G06F 3/061* (2013.01); *G06F 3/0653* (2013.01); *G06F 3/0659* (2013.01)

(58) Field of Classification Search
None
See application file for complete search history.

(56) References Cited

U.S. PATENT DOCUMENTS

| 5,261,071 A * | 11/1993 | Lyon ..................... G06F 9/3834 711/122 |
| 7,653,662 B2 | 1/2010 | Mizutani et al. |
| 9,569,321 B2 * | 2/2017 | Schnapp ............ G06F 11/2066 |
| 2002/0049895 A1 * | 4/2002 | Inoue .................... G06F 9/3824 712/217 |
| 2007/0220215 A1 | 9/2007 | Mizutani et al. |
| 2011/0167247 A1 * | 7/2011 | Gibbs ................. G06F 9/30054 712/240 |
| 2011/0276744 A1 | 11/2011 | Sengupta et al. |

(Continued)

FOREIGN PATENT DOCUMENTS

JP   2007-249772 A   9/2007
JP   2012-141781 A   7/2012

*Primary Examiner* — Brian Peugh
(74) *Attorney, Agent, or Firm* — Oblon, McClelland, Maier & Neustadt, L.L.P.

(57) ABSTRACT

According to an embodiment, an update request reception unit receives a data update request to update data stored in a storage. A read request unit makes a read request to read data from the storage. A data reception unit receives the data from the storage. An update value calculator calculates an update value of the received data. A write request unit makes a write request to write the calculated update value into the storage. A data processing execution unit executes reading and writing on the storage. A history processing unit generates a history of the reading and deletes a history of reading corresponding to the writing. An update information estimator estimates, from the generated history, update information indicating how the data is to be updated. A data update unit updates the data read according to the estimated update information and output new updated data to the data reception unit.

8 Claims, 5 Drawing Sheets

(56) References Cited

U.S. PATENT DOCUMENTS

2012/0203980 A1* 8/2012 Flynn ................ G06F 17/30949
　　　　　　　　　　　　　　　　　　　　　711/154
2015/0286671 A1* 10/2015 Ebiyama ................. G06F 17/30
　　　　　　　　　　　　　　　　　　　　　707/692

* cited by examiner

FIG.5

| ADDRESS |
| --- |
| 0x80001010 |
| 0x60203000 |
| 0x94003a00 |
| 0xe4020080 |
| 0x80001010 |
| ⋮ |

FIG.6

| ADDRESS | ARITHMETIC INFORMATION |
| --- | --- |
| 0x80001010 | +3 |
| 0x60203000 | -2 |
| 0x94003a00 | ×1 |
| 0xe4020080 | +10 |
| 0x80001010 | ×5 |
| ⋮ | ⋮ |

DATA PROCESSING APPARATUS, DATA PROCESSING METHOD, AND COMPUTER PROGRAM PRODUCT, AND ENTRY PROCESSING APPARATUS

CROSS-REFERENCE TO RELATED APPLICATION(S)

This application is based upon and claims the benefit of priority from Japanese Patent Application No. 2014-167882, filed on Aug. 20, 2014; the entire contents of which are incorporated herein by reference.

FIELD

Embodiments described herein relate generally to a data processing apparatus, a data processing method, and a computer program product.

BACKGROUND

A Web service typified by a Web mail and a social network has become widespread in recent years. When a page is to be created in response to a request from a user, Web service inquires for various pieces of data used to create the page from a database. While it is preferred that the database quickly responds to an individual access, the load on the database increases as the number of users increases. The access to the database can be alleviated by using a dynamic random access memory (DRAM) faster than a hard disk drive (HDD) as a storage device to be used as a cache server which temporarily stores data in order to deal with a request for frequent and quick responses.

For example, such cache server is accessed in a data format called a key-value store (KVS) where an identifier "key" of data expressed by a character string having an arbitrary length is used to read/write a piece of data "value" having an arbitrary length. The KVS uses a hash table in which association between the key and the value is managed. The hash table is a technique of mapping an extensive namespace available for the key into an address space of an actual storage that is finite. Then, the throughput of a single server can be increased by implementing processing of the KVS as hardware and, by decreasing the number of servers. This makes it possible to save power consumption, an installation space, a cost of maintenance, and the like.

However, the technique of using the hash table narrows the space, which fundamentally causes a collision to occur. The collision means that different keys correspond to the same entry in the hash table. There is a read delay in the DRAM in which the hash table is stored, for example. Thus it is preferred that, even while certain query processing waits for read data after issuing a read request, a next query issue a data read request. When the same entry is accessed by the certain query and the next query, there occurs read/write contention causing data inconsistency.

BRIEF DESCRIPTION OF THE DRAWINGS

FIG. 5 is a diagram illustrating a history according to a second modification of the first embodiment; and FIG. 6 is a diagram illustrating a history according to a third modification of the first embodiment.

DETAILED DESCRIPTION

According to an embodiment, a data processing apparatus includes an update request reception unit, a read request unit, a data reception unit, an update value calculation unit, a write request unit, a data processing execution unit, a history processing unit, an update information estimation unit, and a data update unit. The update request reception unit receives a data update request to update data stored in a storage unit. The read request unit makes a read request to read data from the storage unit when the data update request is received. The data reception unit receives the data read from the storage unit. The update value calculation unit calculates an update value of the received data. The write request unit makes a write request to write the calculated update value into the storage unit. The data processing execution unit executes reading and writing on the storage unit upon receiving the read request and the write request. The history processing unit generates a history of the reading when the reading is executed and deletes a history of reading corresponding to the writing when the writing is executed. The update information estimation unit to estimates, from the generated history, update information indicating how the data stored in the storage unit is to be updated, when the reading is executed. The data update unit updates the data read from the storage unit according to the estimated update information and output new updated data to the data reception unit.

First Embodiment

Figure 1:
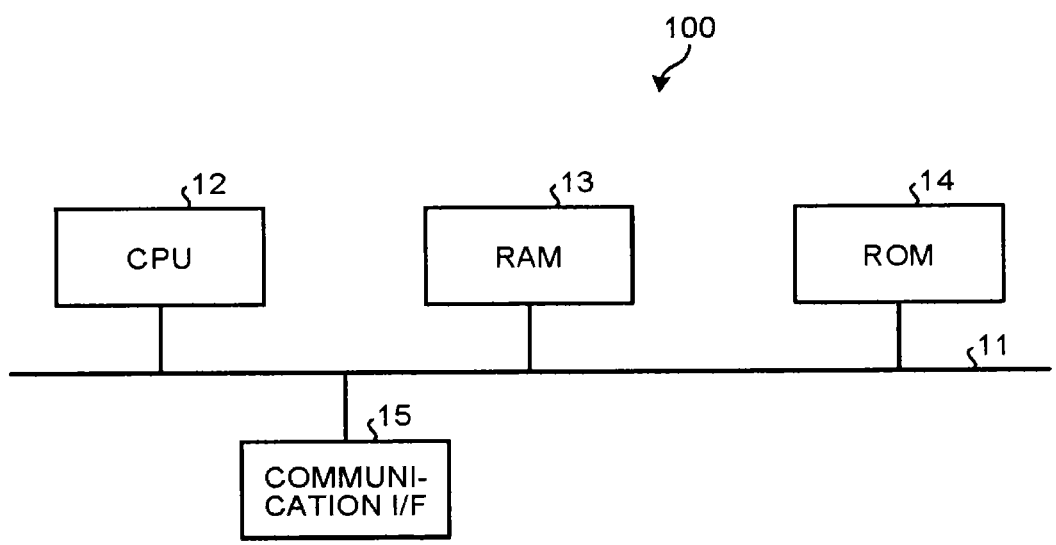
FIG. 1 is a block diagram illustrating a hardware configuration of a data processing apparatus according to a first embodiment.

FIG. 1 is a block diagram illustrating an example of a hardware configuration of a data processing apparatus according to a first embodiment. As illustrated in FIG. 1, a data processing apparatus 100 includes a central processing unit (CPU) 12, a random access memory (RAM) 13, a read only memory (ROM) 14, and a communication interface (I/F) 15. These hardware units are connected to one another by a bus 11.

The CPU 12 controls overall operation of the data processing apparatus 100. The CPU 12 controls the overall operation of the data processing apparatus 100 by running a program stored in the ROM 14 or the like while using the RAM 13 as a work area. The communication I/F 15 is an interface used to communicate with an external device.

Figure 2:
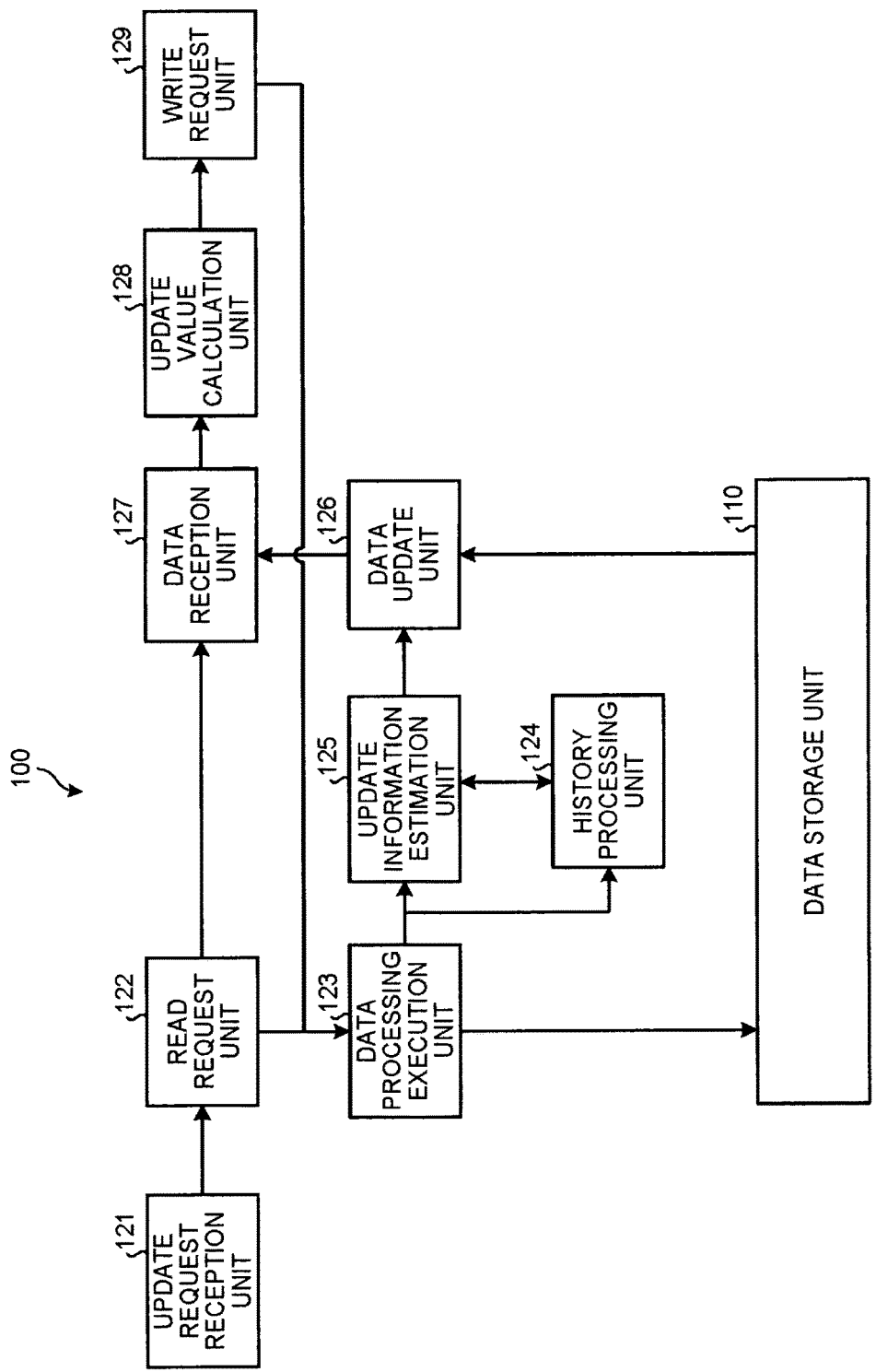
FIG. 2 is a block diagram illustrating a functional configuration of the data processing apparatus according to the first embodiment.

FIG. 2 is a block diagram illustrating an example of a functional configuration of the data processing apparatus according to the first embodiment. As illustrated in FIG. 2, the data processing apparatus 100 includes a data storage unit 110, an update request reception unit 121, a read request unit 122, a data processing execution unit 123, a history processing unit 124, an update information estimation unit 125, and a data update unit 126. The data processing apparatus 100 further includes a data reception unit 127, an update value calculation unit 128, and a write request unit 129. Note that a part or all of the aforementioned units may be implemented by software (a program) or a hardware circuit.

The data processing apparatus 100 successively executes processing of updating data stored in a storage medium such as the data storage unit 110. The first embodiment describes a case, as an example, where the data storage unit 110 stores therein data having a value "10" as a default value, and the data stored in the data storage unit 110 is incremented by one (+1) according to a data update request. This means that when two data update requests are received successively, the data is incremented by one (+1) twice so that a value "12" is written in the data storage unit 110 as a result.

First, pipeline processing performed in the data processing apparatus 100 will be described. The pipeline processing is executed by the update request reception unit 121, the read request unit 122, the data reception unit 127, the update value calculation unit 128, and the write request unit 129 of the data processing apparatus 100. For example, in the case where a data update request is stored in a certain processing unit among the five processing units, a processing unit(s) provided in a stage preceding the certain processing unit can perform predetermined processing in response to a next data update request.

In the aforementioned configuration, the update request reception unit 121 receives the data update request for updating the data stored in the data storage unit 110. In the first embodiment, the data update request is a request for incrementing the data by one (+1). When the update request reception unit 121 receives the data update request, the read request unit 122 makes a read request to the data processing execution unit 123 to read the data from the data storage unit 110. The read request unit 122 further notifies the data reception unit 127 that the data update request is received. Accordingly, the data reception unit 127 is now on standby to receive the data.

The data reception unit 127 then receives the data read from the data storage unit 110. For example, the data reception unit 127 receives the data having a value "10" stored in the data storage unit 110. The update value calculation unit 128 calculates an update value of the data received by the data reception unit 127. For example, the update value calculation unit 128 increments the data having a value "10" received by the data reception unit 127 by one (+1) so as to calculate an update value "11". The write request unit 129 makes a write request to the data processing execution unit 123 to write the update value calculated by the update value calculation unit 128 into the data storage unit 110. The write request unit 129 makes the write request to the data processing execution unit 123 to write the update value "11" calculated by the update value calculation unit 128 into the data storage unit 110, for example.

Here, there will be described an example where processing according to the data update request is executed in the order of a data update request A and a data update request B. The data storage unit 110 has a read delay. Therefore, in order for the throughput of the overall processing to not be adversely affected by the read delay in the data storage unit 110, data is read in response to the data update request B even while it is on standby to read data in response to the data update request A. That is, before reading the data having a value "10" in response to the data update request A, incrementing the data by one (+1), and writing the update value "11" into the data storage unit 110; the data having a value "10" is read in response to the data update request B. At this time, data having a value "12" should be essentially written in the data storage unit 110 upon execution of the data update request A and the data update request B; however, the data having a value "11" is written in the data storage unit 110 instead. The data inconsistency is thus resolved by processing described below.

The data storage unit 110 stores data. The data storage unit 110 is a storage medium such as a DRAM, an NAND flash memory, an SSD (Solid State Drive), or an HDD. Note that the type of the data storage unit 110 is not limited to what is listed above. The first embodiment describes a case, as an example, where the data storage unit 110 stores data having a value "10" as a default value, and the data stored in the data storage unit 110 is incremented by one (+1) according to a data update request.

The update request reception unit 121 receives the data update request to update the data stored in the data storage unit 110. The update request reception unit 121 receives the data update request to increment the data stored in the data storage unit 110 by one (+1), for example. Here, it is assumed that the update request reception unit 121 successively receives the data update request A to increment the data by one (+1) and the data update request B to similarly increment the data by one (+1).

When the update request reception unit 121 receives the data update request, the read request unit 122 makes the read request to read the data from the data storage unit 110. For example, when the update request reception unit 121 receives the data update request A, the read request unit 122 makes the read request to the data processing execution unit 123 to read the data from the data storage unit 110. When the update request reception unit 121 receives the data update request B, the read request unit 122 makes the read request to the data processing execution unit 123 to read the data from the data storage unit 110.

Upon receiving the read request, the data processing execution unit 123 executes reading on the data storage unit 110. For example, when receiving the read request corresponding to the data update request A from the read request unit 122, the data processing execution unit 123 executes reading of the data having a value "10" stored in the data storage unit 110. Likewise, when receiving the read request corresponding to the data update request B from the read request unit 122, the data processing execution unit 123 executes reading of the data having a value "10" stored in the data storage unit 110.

Here, the data storage unit 110 has a read delay. Accordingly, when the data update request B is received before the data corresponding to the data update request A is updated, the data having a value "10" is read from the data storage unit 110 both in the reading corresponding to the data update request A and the reading corresponding to the data update request B.

The history processing unit 124 generates a history of the reading that is executed by the data processing execution unit 123. When the reading corresponding to the data update request A is executed, for example, the history processing unit 124 generates and holds a history indicating that the data update request A is made. When the reading corresponding to the data update request B is executed, the history processing unit 124 generates and holds a history indicating that the data update request B is made.

The update information estimation unit 125 estimates update information, which indicates how the data stored in the data storage unit 110 is to be updated, from the history generated by the history processing unit 124 when the reading is executed by the data processing execution unit 123. For example, when the reading corresponding to the data update request B is executed by the data processing execution unit 123, the update information estimation unit 125 acquires the history generated by the history processing unit 124, which indicates that the data update request A is made. The update information estimation unit 125 estimates, from the history indicating that the data update request A is made, update information indicating that the data read by the reading corresponding to the data update request B is to be incremented by one (+1) according to the data update request A.

Note that the update information estimation unit 125 also checks whether or not the history is generated by the history processing unit 124 when the reading corresponding to the data update request A is executed by the data processing execution unit 123. At this time, the update information estimation unit 125 does not estimate the update information since there is not another data update request nor a history present before executing the reading corresponding to the data update request A.

The data update unit 126 updates the data read from the data storage unit 110 according to the estimated update information. The data update unit 126 for example updates the data having a value "10", which is read by the reading corresponding to the data update request B executed by the data processing execution unit 123, to data having a value "11" according to the update information (indicating that the data is to be incremented by one (+1)) estimated by the update information estimation unit 125. The data update unit 126 then outputs the new updated data having a value "11" to the data reception unit 127. That is, the data output by the data update unit 126 when the data update requests A and B are successively received is the data assumed to be updated by the data storage unit 110 according to the data update request A. Note that when the update information is not estimated by the update information estimation unit 125, the data update unit 126 outputs to the data reception unit 127 the data that is read from the data storage unit 110 but not updated.

The data reception unit 127 then receives the data read from the data storage unit 110. For example, under the state that the reading corresponding to the data update request B has been executed, the data reception unit 127 receives the new data having a value "11" updated by the data update unit 126.

The update value calculation unit 128 calculates the update value of the data received by the data reception unit 127. For example, the update value calculation unit 128 increments the data having a value "11" received by the data reception unit 127 by one (+1) according to the data update request B (the data update request to increment the data by one (+1)) so as to calculate the update value "12".

The write request unit 129 makes a write request to write the calculated update value into the data storage unit 110. For example, the write request unit 129 makes the write request to the data processing execution unit 123 to write the update value "11" calculated by the update value calculation unit 128 into the data storage unit 110. Moreover, the write request unit 129 makes the write request to the data processing execution unit 123 to write the update value "12" calculated by the update value calculation unit 128 into the data storage unit 110.

Upon receiving the write request, the data processing execution unit. 123 executes writing on the data storage unit 110. For example, the data processing execution unit 123 executes writing of the update value "11" into the data storage unit 110 upon receiving the write request to write the update value "11" from the write request unit 129. Moreover, the data processing execution unit 123 executes writing of the update value "12" into the data storage unit 110 upon receiving the write request to write the update value "12" from the write request unit 129. It is originally expected in the first embodiment that the data having a value "12" is written into the data storage unit 110 in the end.

Once the writing has been executed by the data processing execution unit 123, the history processing unit 124 deletes the history of the reading corresponding to the writing. For example, once the data processing execution unit 123 has executed the writing of the update value "11" into the data storage unit 110, the history processing unit 124 deletes the history corresponding to the data update request A being held. Moreover, once the data processing execution unit 123 has executed the writing of the update value "12" into the data storage unit 110, the history processing unit 124 deletes the history corresponding to the data update request B being held. That is, the data read by the reading after the writing corresponding to the data update request A is executed is the correct data originally expected so that the history need not be held. In other words, the history is held only during the time from when the reading according to the corresponding data update request is executed to when the writing executed and, during that time, the history is used to estimate the update information.

Figure 3:
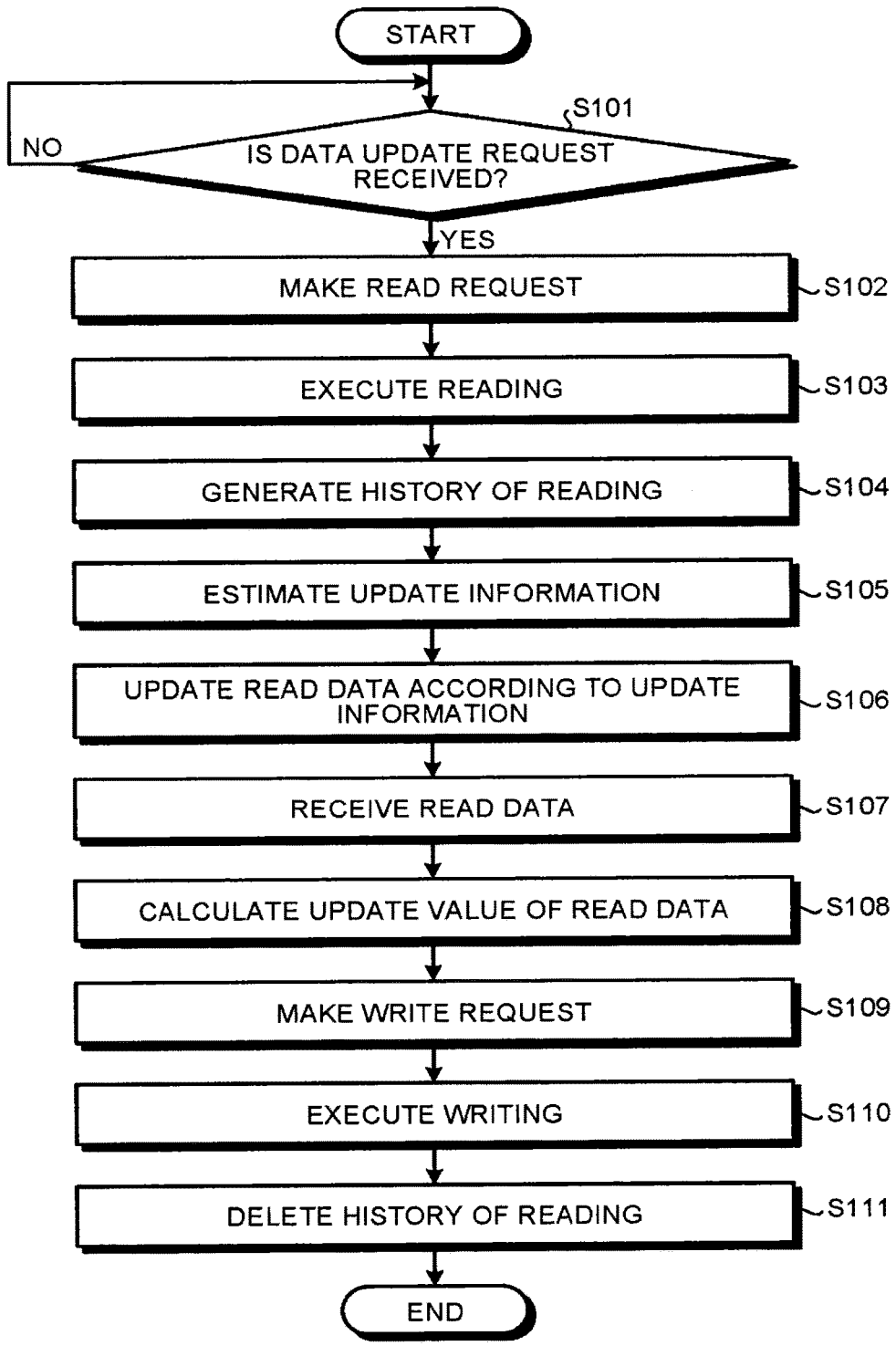
FIG. 3 is a flowchart illustrating the flow of data processing according to the first embodiment.

The flow of data processing according to the first embodiment will now be described with reference to FIG. 3. FIG. 3 is a flowchart illustrating an example of the flow of data processing according to the first embodiment.

As illustrated in FIG. 3, the read request unit 122 makes the read request to the data processing execution unit 123 to read the data from the data storage unit 110 (step S102) when the update request reception unit 121 receives the data update request (step S101: Yes). On the other hand, the update request reception unit 121 is on standby to receive the data update request when the data update request is not received (step S101: No). When receiving the read request from the read request unit 122, the data processing execution unit 123 executes reading of the data stored in the data storage unit 110 (step S103).

The history processing unit 124 generates and holds a history indicating that the data update request corresponding to the reading is made (step S104) when the reading is executed by the data processing execution unit 123. When the reading is executed by the data processing execution unit 123, the update information estimation unit 125 estimates the update information, which indicates that the data read by the reading is to be incremented by one (+1) according to a previous data update request, from the history that is generated by the history processing unit 124 and indicates that the data update request is made (step S105).

The data update unit 126 updates the data, which is read by the reading corresponding to the data update request executed by the data processing execution unit 123, according to the update information estimated by the update information estimation unit 125 (step S106). The data reception unit 127 receives the new data updated by the data update unit 126 (step S107). The update value calculation unit 128 increments the data received by the data reception unit 127 by one (+1) according to the data update request so as to calculate the update value (step S108).

The write request unit 129 makes the write request to the data processing execution unit 123 to write the update value calculated by the update value calculation unit 128 into the data storage unit 110 (step S109). The data processing execution unit 123 executes writing of the update value into the data storage unit 110 upon receiving the write request to write the update value from the write request unit 129 (step S110). The history processing unit 124 deletes the history of the reading corresponding to the data update request of the writing once the writing of the update value is executed on the data storage unit 110 by the data processing execution unit 123 (step S111).

The first embodiment is adapted to hold the history of the reading executed on the data storage unit 110, estimate from the history up to that point the update information indicating how the data read from the data storage unit 110 is updated when executing the reading, and update the read data according to the update information. Therefore, the data inconsistency can be reduced even when the read delay occurs in the data storage unit 110.

First Modification of First Embodiment

Figure 4:
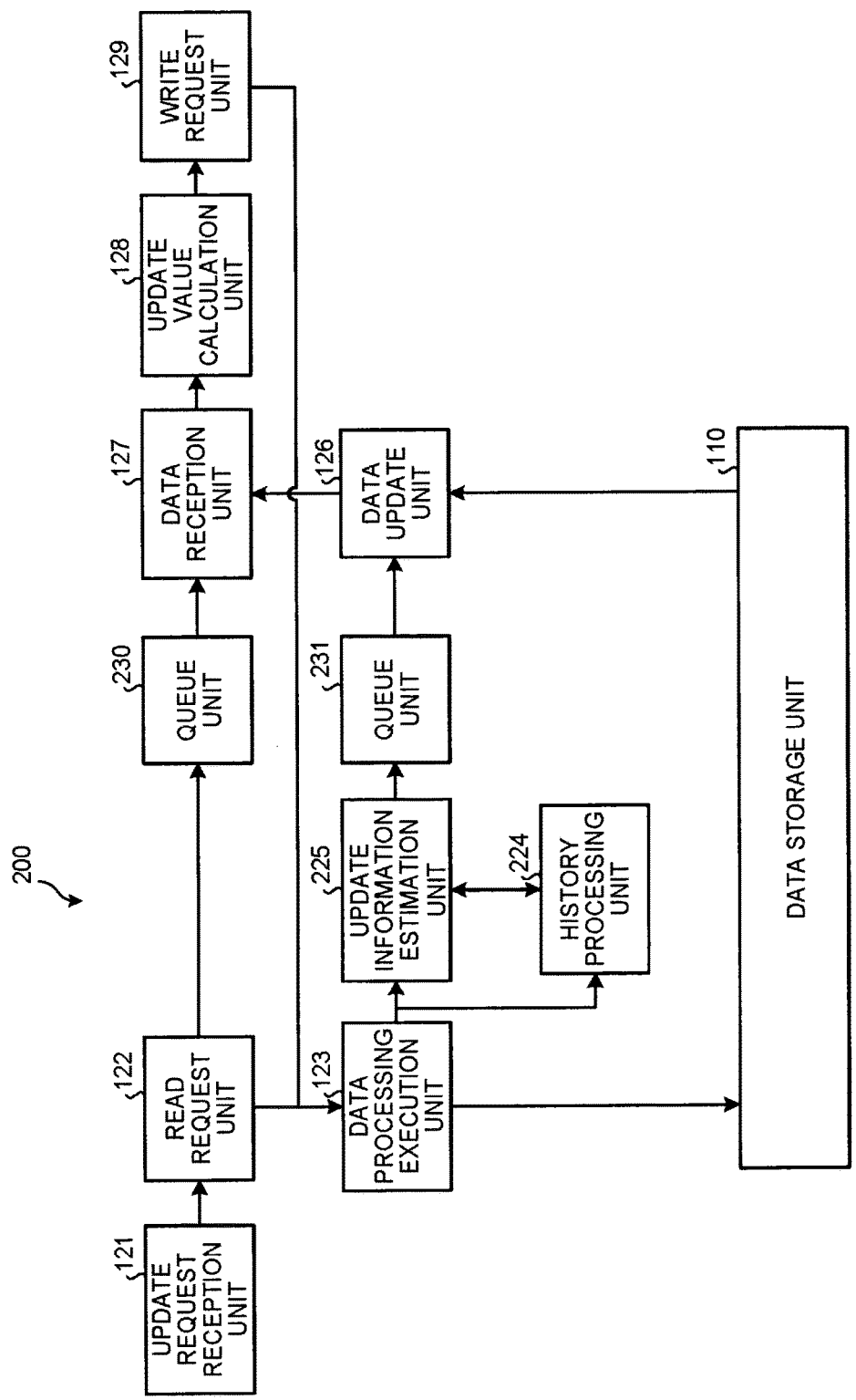
FIG. 4 is a block diagram illustrating a functional configuration of a data processing apparatus according a first modification of the first embodiment.

The configuration of a data processing apparatus according to the first embodiment may be provided with a queue unit 230 and a queue unit 231 that wait for read data for a read request unit 122 and an update information estimation unit 225 as illustrated in FIG. 4. FIG. 4 is a block diagram illustrating an example of a functional configuration of the data processing apparatus according to a first modification of the first embodiment. In the first modification of the first embodiment, a configuration similar to that in the first embodiment is assigned the same reference numeral as that in the first embodiment to omit detailed description of the similar configuration in some cases. Specifically, the function, configuration and processing other than a history processing unit 224, the update information estimation unit 225, the queue unit 230, and the queue unit 231 illustrated below are similar to those of the first embodiment.

As illustrated in FIG. 4, a data processing apparatus 200 includes a data storage unit 110, an update request reception unit 121, the read request unit 122, a data processing execution unit 123, the history processing unit 224, the update information estimation unit 225, and a data update unit 126. In addition, the data processing apparatus 200 includes a data reception unit 127, an update value calculation unit 128, a write request unit 129, the queue unit 230, and the queue unit 231. Note that a part or all of the aforementioned units may be implemented by software (a program) or a hardware circuit.

The queue unit 230 and the queue unit 231 can queue a plurality of data update requests. For example, the queue unit 230 and the queue unit 231 queue a data update request B after a data update request A while waiting for the read data upon queuing the data update request A. The data processing apparatus 200 can therefore receive a data update request C and a data update request D to execute reading even when the read data of the data update request A is not being read. As a result, the data processing apparatus 200 can successively receive the data update requests without decreasing the overall throughput, even when a large read delay occurs in the data storage unit 110.

A history corresponding to the reading of the data update request may be held in the form of the number of times the data update request is received. For example, the data update request is a request to increment the data by one (+1), so that the history processing unit 224 may hold the number of times the data update request is received, namely, the number of times the reading is executed by the data processing execution unit 123. The update information estimation unit 225 at this time estimates update information indicating that the data is incremented by one (+1) the number of times the reading is executed the number of times being held by the history processing unit 224. The data update unit 126 then increments the data read from the data storage unit 110 by one (+1) the number of times the reading is executed on the basis of the update information estimated by the update information estimation unit 225, and outputs new data to the data reception unit 127.

There will now be described an example where the data update requests are received in the order of the data update request A, the data update request B, and the data update request C. For example, when reading of the data update request B is executed by the data processing execution unit 123, the update information estimation unit 225 estimates update information that the data is incremented by one (+1) the number of times the reading is executed, namely "once", since a history held by the history processing unit 224 corresponds only to the reading of the data update request A. When the reading of the data update request A is not completed under the state where reading of the data update request C has been executed by the data processing execution unit 123 later on, the update information estimation unit 225 estimates update information that the data is incremented by one (+1) the number of times the reading is executed, namely "twice", since the history held by the history processing unit 224 corresponds to the reading of the data update requests A and B. That is, the data update unit 126 increments data having a value "10" read from the data storage unit 110 by one (+1) "twice", and outputs new data having a value "12" to the data reception unit 127. The update value calculation unit 128 then calculates, as an update value of the data update request C, an update value "13" by incrementing the data having a value "12" received by the data reception unit 127 by one (+1). As a result, the data having a value "13" is written in the data storage unit 110 when the data update request C is received while the reading of the data update request A is not yet completed.

When the reading of the data update request A is completed under the state where the reading of the data update request C has been executed by the data processing execution unit 123, a history corresponding to the reading of the data update request A has been deleted by the history processing unit 224. This means that the update information estimation unit 225 estimates the update information that the data is incremented by one (+1) the number of times the reading of the data update request B, namely "once". At this time, the update result "11" of the data update request A is written in the data storage unit 110, so that the data update unit 126 increments the data having a value "11" read from the data storage unit 110 by one (+1) "once", and outputs new data having a value "12" to the data reception unit 127. The update value calculation unit 128 then calculates, as an update value of the data update request C, an update value "13" by incrementing the data having a value "12" received by the data reception unit 127 by one (+1). As a result, when the data update request C is received under the state that writing of the data update request A is completed, the data having a value "13" is written in the data storage unit 110.

According to the first modification of the first embodiment, the data update request is queued both during the time from when the read request is made by the read request unit 122 to when the data is received by the data reception unit 127 and from when the update information is estimated by the update information estimation unit 225 to when the data is received by the data update unit 126. Therefore, the data inconsistency can be reduced even when more data update requests are received successively.

Second Modification of First Embodiment

A data storage unit 110 according to the first embodiment can store a plurality of pieces of data. At this time, a data update request received by a data processing apparatus 100 holds address information of data to be updated. That is, a plurality of addresses can be selectively accessed by specifying an address to each of the plurality of pieces of data stored in the data storage unit 110. Accordingly, an address is specified when reading/writing data, so that a data processing execution unit 123 executes reading or writing on the specified address.

When reading according to the data update request has been executed by specifying the address, the history processing unit 124 generates and holds a history, which indicates that the reading corresponding to the data update request has been executed, in association with the specified address. Simply put, only the specified address need be held. FIG. 5 is a diagram illustrating an example of a history according to a second modification of the first embodiment. As illustrated in FIG. 5, the history holds addresses specified in the reading corresponding to each data update request.

There will now be described an example, with reference to FIG. 5, where the data update requests are received in the order of a data update request A, a data update request B, a data update request C, a data update request D, a data update request E, and a data update request F. It is assumed, for example, that an address "0x80001010" is specified for the data update request A, an address "0x60203000" is specified for the data update request B, and an address "0x94003a00" is specified for the data update request C. Likewise, it is assumed that an address "0xe4020080" is specified for the data update request D, an address "0x80001010" is specified for the data update request E, and an address "0x80001010" is specified for the data update request F. The data update request F is assumed to be a data update request that is newly received. As described above, the history as illustrated in FIG. 5 is generated and held by the history processing unit 124 according to the execution of the reading.

For example, when the reading according to the data update request F with the specified address "0x80001010" is executed by the data processing execution unit 123, an update information estimation unit 125 verifies that an address identical to the address specified for the data update request F is present in the history held by the history processing unit 124. The address identical to the address specified for the data update request F is specified for the data update request A and the data update request E in this case. The update information estimation unit 125 then estimates update information that the data is incremented by one (+1) "twice" since there are two addresses identical to the address specified for the data update request F. In other words, the update information estimation unit 125 estimates the update information that the data is incremented by one (+1) "n times" when n pieces of the identical address are present. Accordingly, a data update unit 126 increments data having the address "0x80001010" and read from the data storage unit 110 by one (+1) "twice", and outputs new data to the data reception unit 127. Note that when the specified address is "0x80002000", the data update unit 126 directly outputs the data read from the data storage unit 110 to the data reception unit 127 because a history corresponding to an address identical to the specified address is not present.

The specified address may be an address of data itself to be incremented by one (+1) or a start address of a predetermined data structure including the data to be incremented by one (+1), and thus need not strictly be the address of the data. That is, the address need only be the one including information by which the data to be incremented by one (+1) can be identified in the end.

The second modification of the first embodiment is adapted to hold the address of the data to be updated in the history according to the data update request, so that the data inconsistency can be reduced even when the plurality of data update requests is received for data having different addresses.

Third Modification of First Embodiment

A data update request received by a data processing apparatus according to the first embodiment need not be an increment by one (+1) but may be an arbitrary operation. A different operation may be adopted for each data update request as well. That is, the data update request holds an address specified for a plurality of pieces of data stored in a data storage unit 110 as well as information of arithmetic by which arithmetic can be identified.

When reading according to the data update request has been executed by specifying the address, a history processing unit 124 generates and holds a history, which indicates that the reading corresponding to the data update request has been executed, in association with the specified address and the information of the arithmetic. FIG. 6 is a diagram illustrating an example of a history according to a third modification of the first embodiment. As illustrated in FIG. 6, the history holds an address specified by the reading corresponding to each data update request as well as information of arithmetic corresponding to data having that address.

There will now be described an example, with reference to FIG. 6, where the data update requests are received in the order of a data update request A, a data update request B, a data update request C, a data update request D, a data update request E, and a data update request F. An address "0x80001010" is specified for the data update request A, and "+3" is set as the information of the arithmetic corresponding to data having that address, for example. An address "0x60203000" is specified for the data update request B, and "−2" is set as the information of the arithmetic corresponding to data having that address. An address "0x94003a00" is specified for the data update request C, and "×1" is set as the information of arithmetic corresponding to data having that address. An address "0xe4020080" is specified for the data update request D, and "+10" is set as the information of arithmetic corresponding to data having that address. An address "0x80001010" is specified for the data update request E, and "×5" is set as the information of arithmetic corresponding to data having that address. In addition, it is assumed that an address "0x80001010" is specified for the data update request F which is newly received and that "+1" is set as the information of arithmetic corresponding to data having that address. As described above, the history as illustrated in FIG. 6 is generated and held by the history processing unit 124 according to the execution of the reading.

For example, when the reading of the data update request F with the specified address "0x80001010" and the information of arithmetic "+1" is executed by a data processing execution unit 123, an update information estimation unit 125 verifies that an address identical to the address specified for the data update request F is present in the history held by the history processing unit 124. The address identical to the address specified for the data update request F is specified for the data update request A and the data update request E in this case. The update information estimation unit 125 then estimates update information that "+3" and "×5" operations are performed from the information of arithmetic corresponding to the address identical to the address specified for the data update request F. Accordingly, when "10" is a value of the data corresponding to the address "0x80001010" in the data storage unit 110, for example, a data update unit 126 updates the data having a value "10" read from the data storage unit 110 to data having a value "(10+3)×5=65" and outputs the new data having a value "65" to a data reception unit 127. An update value calculation unit 128 thereafter performs a "+1" operation on the data having a value "65" received by the data reception unit 127 on the basis of the information of arithmetic "+1" of the data update request F, so as to calculate an update value "66".

The third modification of the first embodiment is adapted to hold the information of arithmetic of the data to be updated in the history according to the data update request, so that the data inconsistency can be reduced even when different information of arithmetic performed for each data update request.

Second Embodiment

The present invention may be carried out in various different embodiments in addition to the aforementioned embodiment. Now, a different embodiment with regard to (1) configuration and (2) program will be described.

(1) Cconfiguration

The information including the procedure, control procedure, specific name, and various data and parameters illustrated in the aforementioned description and drawings can be modified at will unless otherwise specified. Moreover, each component of the apparatus in the drawings illustrates a functional concept and does not necessarily have to be physically configured as illustrated in the drawings. That is, a specific mode of distribution or integration of the apparatus is not limited to what is illustrated in the drawings where all or a part of the apparatus can be functionally or physically distributed or integrated by an arbitrary unit according to various loads, a use status and the like.

For example, a data storage unit 110 need not be included in a data processing apparatus 100 but may be provided as an external storage medium that can communicate with the data processing apparatus 100. Each function included in the data processing apparatus 100 may be implemented by cloud computing as well. Moreover, the deleting a history by a history processing unit 124 may be implemented by invalidating information of arithmetic, for example. For example, when writing of the data update request A is executed under the state where data having a value "10" is stored in the data storage unit 110 and there is held a history in which "+1 (corresponding to a data update request A)" and "+3 (corresponding to a data update request B)" are stored as the information of arithmetic corresponding to an address A in the data storage unit 110, the information of arithmetic corresponding to the data update request A is updated to "0". In addition, there may be set a flag indicating that the information of arithmetic corresponding to the data update request A is not to be used, so that the flagged information of arithmetic is not used. That is, the history need not be deleted when the information of arithmetic is updated such that an expected update value can be calculated as a result.

The data processing apparatus may also be a server device equipped with Key-Value Store which stores key-value data, for example. Such server device receives a query request (data update request) from a client and responds to the request. For example, the server device stores a value 1, a value 2, and a value 3 in association with a key 1, a key 2, and a key 3, and has functions of receiving a request from the client to read a value corresponding to the key 2, reading the value 2 being stored, and responding to the client.

Such Key-Value Store typically stores a key in association with a value in metadata called a hash table. That is, a hash value of H1 is obtained when the key 1 is put into a hash function so that an address of the value 1 on a storage is stored as an entry in a table where H1 corresponds to an address in the hash table, for example. As a result, when the read request for the key 1 is received, H1 can be obtained in a similar manner to be able to obtain the address of the value 1 by accessing the hash table and respond by immediately accessing the value.

The hash table is a technique of mapping an extensive namespace available for the key into an address space of an actual storage that is finite. This means that the space is narrowed, fundamentally causing a collision to occur. A number of algorithms have been proposed to resolve the collision such as a method called "bucket hashing" by which an access is made by the unit of a bucket putting together a plurality of entries that can be stored in the same bucket. Here, the size of an access unit of a storage device is utilized to be able to perform a read by the unit of a bucket and realize a search in one go. An entry is added one at a time when there is space in the bucket and, when the bucket becomes full, it is treated as a collision. Although it is difficult to avoid the collision with this technique, the frequency of the collision can be decreased.

The bucket may have a 256-byte data structure capable of storing 16 keys each of which is 16 bytes long, but the data length and the data structure are not limited to what is described herein. It may also be adapted to store a shortened byte string (such as two bytes) formed by performing a predetermined operation on the key which, when held as is, increases the data length. In this case, 128 entries can be added to the 256-byte bucket, for example.

The operation of storing data by bucket hashing is implemented as follows when adopting the configuration illustrated in FIG. 2. Upon receiving a request to store data, for example, the server device uses a predetermined hash function to identify a bucket address to be stored from a specified key. An update request reception unit 121 receives a request to store an entry in the bucket. A read request unit 122 specifies an address of the bucket and outputs a request to read the bucket to a data processing execution unit 123. Once a read command is issued by the data processing execution unit 123, an update information estimation unit 125 refers to a history held by a history processing unit 124 to check whether or not a bucket read is performed immediately before the present moment. When the bucket read is performed immediately before the present moment, the update information estimation unit 125 estimates that the entry is stored the number of bucket reads ahead in the bucket.

Assuming the bucket capable of storing 16 entries, for example, the update information estimation unit 125 estimates update information that two vacant entries are filled when two data update requests are already present in the history. When one entry is already filled in the bucket being read (there are 15 vacancies), a data update unit 126 updates bucket information to indicate two entries are filled and then outputs the information to a data reception unit 127. An update value calculation unit 128 updates the bucket such that an entry specified by a storage request is stored in a fourth entry. A write request unit 129 makes a request to the data processing execution unit 123 to perform a write to the bucket in which four entries are filled. It is an expected operation to perform a write to the bucket storing the four entries.

Note that the aforementioned operation is performed in the similar manner when the server device receives a request to delete an entry. When the server device receives the delete request to delete the entry, the history processing unit 124 holds the delete request in association with a piece of information (such as information of arithmetic described in the third modification of the first embodiment) by which whether each data update request is made to add data or to delete data can be identified. The update information estimation unit 125 estimates, on the basis of the information of arithmetic, that an addition of "(two entries) (−one entry)=one entry" is performed when there are information of arithmetic corresponding to two additions and information of arithmetic corresponding to one deletion, for example. When five entries are already added in the bucket being read, for example, the update information estimation unit 125 estimates that six entries are added on the basis of the aforementioned estimation of one addition. The update value calculation unit 128 calculates a state of five entries obtained by deleting one entry from the six entries, when the data update request is a deletion request. As a result, the write request unit 129 makes a request to perform writing of five entries. It is an expected operation to end up with the five entries since the data update requests corresponding to two additions and two deletions are received for the state where five entries are present.

The aforementioned operation allows for a correct addition/deletion of the entry without causing the data inconsistency to occur even when the data update request to add/delete an entry to a plurality of buckets is received simultaneously.

(2) Program

The data processing apparatus according to the aforementioned embodiment can be implemented by employing a general-purpose computer apparatus as basic hardware, for example. A data processing program to be executed has a module configuration including each of the aforementioned functions. The data processing program may be provided while recorded in a computer-readable recording medium such as a CD-ROM, a CD-R, or a DVD in an installable or executable file format, or may be provided while incorporated beforehand in a ROM or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing apparatus comprising:
   at least one memory having computer executable components stored therein; and
   at least one processor communicatively coupled to the memory, the processor is configured to
   receive a data update request to update data stored in a storage unit;
   when the data update request is received, execute reading and writing of data from and to the storage unit corresponding to the data update request received,
   when reading corresponding to a first data update request is executed, generate a history indicating the first data update request is made,
   when reading corresponding to a second data update request is executed before writing corresponding to the first data update request is completed, the second data update request being received after receiving the first data update request, update data read by the reading corresponding to the second data update request to data that is written to the storage unit by the writing corresponding to the first data update request and that is indicated by the history generated, and
   decide data that is written to the storage unit on the basis of the data updated by the updating and information according to writing corresponding to the second data update request.

2. The apparatus according to claim 1, wherein
   the receiving includes receiving the data update request including address information of data to be updated,
   the executing includes executing reading and writing the data on the basis of the address information,
   the generating includes generating the history including the address information used in the reading corresponding to the first data update request, and
   when reading corresponding to the second data update request including address information identical to address information included in the first data update request is executed before writing corresponding to the address information included in the first data update request is completed, the updating includes updating data read by the reading corresponding to the second data update request to data that is written to the storage unit by the writing corresponding to the first data update request and that is indicated by the history generated.

3. The apparatus according to claim 1, wherein
   the receiving includes receiving the data update request including information of arithmetic performed on data to be updated,
   the generating includes generating the history including the information of arithmetic corresponding to the first data update request,
   the updating includes updating, based on the information of arithmetic included in the history generated, data read by the reading corresponding to the second data update request to data that is written to the storage unit by the writing corresponding to the first data update request and that is indicated by the history generated, and
   the deciding includes deciding data that is written to the storage unit on the basis of the data updated by the updating and the information of arithmetic corresponding to the second data update request.

4. The apparatus according to claim 1,
   wherein the processor is further configured to
   when the second data update request is received while waiting for the reading data from the storage unit corresponding to the first data update request upon queuing the first data update request, queue the second data update request after the first data update request.

5. The apparatus according to claim 1, wherein the processor is further configured to, when writing is executed by the executing, delete the history of the data update request corresponding to the writing.

6. A data processing method comprising:
   receiving a data update request to update data stored in a storage unit;
   when the data update request is received, executing reading and writing of data from and to the storage unit corresponding to the data update request received;
   when reading corresponding to a first data update request is executed, generating a history indicating the first data update request is made;
   when reading corresponding to a second data update request is executed before writing corresponding to the first data update request is completed, the second data update request being received after receiving the first data update request, updating data read by the reading corresponding to the second data update request to data that is written to the storage unit by the writing corresponding to the first data update request and that is indicated by the history generate; and deciding data that is written to the storage unit on the basis of the data updated and information according to writing corresponding to the second data update request.

7. A computer program product comprising a non-transitory computer-readable medium containing programmed instructions, the instructions causing a computer to execute:

receiving a data update request to update data stored in a storage unit;

when the data update request is received, executing reading and writing of data from and to the storage unit corresponding to the data update request received;

when reading corresponding to a first data update request is executed, generating a history indicating the first data update request is made;

when reading corresponding to a second data update request is executed before writing corresponding to the first data update request is completed, the second data update request being received after receiving the first data update request, updating data read by the reading corresponding to the second data update request to data that is written to the storage unit by the writing corresponding to the first data update request and that is indicated by the history generate; and deciding data that is written to the storage unit on the basis of the data updated and information according to writing corresponding to the second data update request.

8. An entry processing apparatus comprising:

at least one memory having computer executable components stored therein; and at least one processor communicatively coupled to the memory, the processor is configured to receive an update request, the update request being either an addition request to add an entry to a storage unit for storing therein an entry that includes a key and a value or a deletion request to delete an entry from the storage unit, when the update request is received, specify an address of a bucket having a plurality of entries stored therein and execute reading and writing of the bucket, when reading corresponding to a first update request is executed, generate as a history processing information indicating which request the first update request is, an addition request to add an entry to a bucket read or a deletion request to delete an entry from the bucket read, when reading corresponding to a second update request is executed before writing corresponding to the first update request is completed, the second update request being received after receiving the first update request, update a bucket read by the reading corresponding to the second update request to a bucket that is written to the storage unit by the writing corresponding to the first update request and that is indicated by the history generated on the basis of the processing information included in the history, and decide a bucket that is written to the storage unit on the basis of the bucket updated by the updating and the processing information corresponding to the second update request.

* * * * *